(12) United States Patent
Billman (10) Patent No.: US 9,235,832 B1
(45) Date of Patent: Jan. 12, 2016

(54) SYSTEMS AND METHODS FOR DETECTING TRANSACTIONS ORIGINATING FROM AN UNAUTHENTICATED ATM DEVICE

(75) Inventor: Bradly J. Billman, San Antonio, CA (US)

(73) Assignee: United Services Automobile Association (USAA), San Antonio, TX (US)

( * ) Notice: Subject to any disclaimer, the term of this patent is extended or adjusted under 35 U.S.C. 154(b) by 1156 days.

(21) Appl. No.: 12/407,472

(22) Filed: Mar. 19, 2009

(51) Int. Cl.
*G06Q 99/00* (2006.01)
*G06Q 20/10* (2012.01)
*G06Q 20/18* (2012.01)
*G06Q 20/38* (2012.01)

(52) U.S. Cl.
CPC ............ *G06Q 20/1085* (2013.01); *G06Q 20/18* (2013.01); *G06Q 20/388* (2013.01)

(58) Field of Classification Search
CPC .. G06Q 20/1085; G06Q 20/18; G06Q 20/388
USPC ......................................... 705/50; 726/26–28
See application file for complete search history.

(56) References Cited

U.S. PATENT DOCUMENTS

| | | | |
|---|---|---|---|
| 7,149,895 B1 * | 12/2006 | Asokan et al. ................. | 713/159 |
| 7,213,766 B2 * | 5/2007 | Ryan et al. ..................... | 235/492 |
| 7,234,636 B1 * | 6/2007 | Brausch et al. ................ | 235/379 |
| 7,296,156 B2 * | 11/2007 | Marmigere et al. ........... | 713/170 |
| 7,309,004 B1 * | 12/2007 | Muschellack et al. ........ | 235/379 |
| 7,320,072 B1 | 1/2008 | Cofta | |
| 7,562,222 B2 * | 7/2009 | Gasparini et al. ............. | 713/170 |
| 7,941,664 B2 * | 5/2011 | Wheeler et al. ................ | 713/170 |
| 8,100,323 B1 * | 1/2012 | Crews et al. ................... | 235/379 |
| 8,555,337 B2 * | 10/2013 | Blom et al. ..................... | 726/2 |
| 2002/0027922 A1 | 3/2002 | Nicoll et al. | |
| 2004/0124966 A1 | 7/2004 | Forrest | |
| 2006/0282662 A1 * | 12/2006 | Whitcomb ..................... | 713/156 |
| 2007/0058835 A1 * | 3/2007 | Schrijen et al. ............... | 382/100 |
| 2007/0088950 A1 * | 4/2007 | Wheeler et al. ................ | 713/170 |

(Continued)

OTHER PUBLICATIONS

"Heads Up ALERT", http://www.heads-up.ca/hottips/Tips/lebanese%20loop.pdf>, 1 page.

(Continued)

*Primary Examiner* — James D Nigh
(74) *Attorney, Agent, or Firm* — Kane Kessler, P.C.; Barry E. Negrin (57) ABSTRACT

A system, method, and computer-usable medium are disclosed for authenticating a financial transaction terminal, such as an automated teller machine. A user provides financial account data, such as an account number, which is then combined with a unique identifier of the financial transaction terminal to generate terminal authentication data. The terminal authentication data is provided to a terminal authentication system, which extracts the financial account data and the unique identifier of the financial transaction terminal. The unique identifier of the financial transaction terminal is compared to a list of authentic financial transaction terminal identifiers. If its authenticity is confirmed, then a shared secret corresponding to the user's financial account data is provided to the authenticated financial transaction terminal. The user is queried as to the authenticity of the shared secret. If the response is affirmative, then the user is prompted to provide user authentication information, such as a Personal Identification Number (PIN), and the transaction proceeds. Otherwise, the transaction is discontinued.

14 Claims, 3 Drawing Sheets

(56) References Cited

U.S. PATENT DOCUMENTS

| | | | |
|---|---|---|---|
| 2007/0098224 A1* | 5/2007 | Morita | 382/115 |
| 2007/0143230 A1* | 6/2007 | Narainsamy et al. | 705/75 |
| 2007/0219926 A1* | 9/2007 | Korn | 705/67 |
| 2008/0034221 A1 | 2/2008 | Hammad et al. | |
| 2008/0040285 A1* | 2/2008 | Wankmueller | 705/67 |
| 2008/0077795 A1* | 3/2008 | MacMillan | 713/169 |
| 2008/0109657 A1* | 5/2008 | Bajaj et al. | 713/168 |
| 2008/0215887 A1* | 9/2008 | Hart et al. | 713/172 |
| 2009/0077653 A1* | 3/2009 | Osborn et al. | 726/17 |
| 2009/0164373 A1* | 6/2009 | Blythe | 705/44 |
| 2009/0305673 A1* | 12/2009 | Mardikar | 455/411 |
| 2009/0307748 A1* | 12/2009 | Blom et al. | 726/2 |
| 2010/0169192 A1* | 7/2010 | Zoldi et al. | 705/30 |
| 2010/0191626 A1* | 7/2010 | Nonaka | 705/30 |

OTHER PUBLICATIONS

"ATM Cash-point Scams using "Lebanese Loop" Plastic Sleeves / Skimming Devices Street Scam Frauds", http://www.crimes-of-persuasion.com/Crimes/InPerson/atm_scams.htm>, 14 pages.

"Yellow box plan to beat card scam", BBC News, Mar. 17, 2004, 2 pages.

* cited by examiner

SYSTEMS AND METHODS FOR DETECTING TRANSACTIONS ORIGINATING FROM AN UNAUTHENTICATED ATM DEVICE

BACKGROUND

1. Field of the Disclosure

Embodiments of the disclosure relate in general to the field of computers and similar technologies, and in particular to software utilized in this field. Still more particularly, it provides a system, method, and computer-usable medium for authenticating an unknown financial transaction terminal.

2. Description of the Related Art

Identity theft is an ongoing problem for both consumers and financial institutions, and its perpetrators continue to become more sophisticated in their use of technology. One such scam is Automated Teller Machine (ATM) spoofing, where identity thieves place a fake, but realistic looking, automated teller machine in a busy location. The unsuspecting account holder inserts their card and enters their personal identifier (PIN), only to have the machine tell them that the machine is either out of order or that the network is down. In reality, the fake ATM has captured their account and personal identification information, which is then used by the identity thieves at legitimate ATMs to illegally withdraw funds from the victim's financial account.

The underlying issue is that the consumer is unable to determine whether an ATM is authentic or not. If not, then they may unknowingly give away their identity information. Another, less obvious issue, is whether a financial institution can determine the authenticity of an ATM that is attached to its financial network. The spoofing of network addresses is well known, and a known network address assigned to an ATM is now insufficient to prove the authenticity of the ATM. Furthermore, ATMs are increasingly using wireless networks for connectivity. The combination of network address spoofing and wireless network connectivity presents additional challenges to authenticating an ATM.

Known approaches for proving the authenticity of a financial institution during an online session include the display of a shared secret to the account holder. In these approaches, the user's computing device is typically identifiable by the financial institution. Once the computing device is identified and authenticated, the shared secret is presented to the user and authentication information, such as a Personal Identification Number (PIN) or password is requested. However, this is currently not the case for public ATMs. A shared secret provided by a financial institution to a fake ATM can be captured in addition to the user's account number and PIN. As a result, the user's financial and online identity is subject to further compromise.

BRIEF SUMMARY

A system, method, and computer-usable medium are disclosed for authenticating an unknown financial transaction terminal. In various embodiments, a financial transaction terminal, such as an automated teller machine (ATM) is authenticated to a user. In these and other embodiments, the user provides financial account data, such as an account number, to the financial transaction terminal. The financial account data is then combined with a unique identifier of the financial transaction terminal to generate terminal authentication data. In one embodiment, the terminal authentication data is generated by the terminal authentication module implemented as a client on the financial transaction terminal. In one embodiment, the unique terminal identifier comprises a media access control (MAC) address. In another embodiment, the unique terminal identifier comprises an international mobile equipment identity (IMEI). In yet another embodiment, the unique terminal identifier comprises a network address, such as an Internet Protocol (IP) or System Network Architecture (SNA) address.

The terminal authentication data is then provided to a terminal authentication system, which extracts the financial account data and the unique identifier of the financial transaction terminal. Once extracted, the unique identifier of the financial transaction terminal is compared to a list of authentic financial transaction terminal identifiers. In various embodiments, the extraction and comparison operations are performed by a terminal authentication module implemented as a server on the terminal authentication system. If the authenticity of the unique terminal identifier is confirmed, then a shared secret corresponding to the financial account data is retrieved by the terminal authentication system. In various embodiments, the shared secret may comprise a word, a phrase, an alphanumeric string, a graphical element, or any combination of graphical and alphanumeric elements selected by the user or provided on behalf of the user by the terminal authentication system. Shared secret data is then generated from the shared secret. In one embodiment, the shared secret data is generated by a terminal authentication module implemented as a server on the terminal authentication system.

The shared secret data is then provided to the authenticated financial transaction terminal where it is processed to extract the shared secret. In one embodiment, the shared secret is extracted by a terminal authentication module implemented as a client on the financial transaction server. The user is queried as to the authenticity of the shared secret. If the response is affirmative, then the user is prompted to provide user authentication information, such as a Personal Identification Number (PIN), and the transaction proceeds. Otherwise, the transaction is discontinued. Once extracted, the shared secret is displayed to the user and the user is then prompted to respond whether the displayed shared secret is authentic. If an affirmative response is received, then the user is prompted to provide authentication information, such as a Personal Identification Number (PIN). The user then provides the requested authentication information and the transaction is continued.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

A system, method, and computer-usable medium are disclosed for authenticating an unknown financial transaction terminal. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer-usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
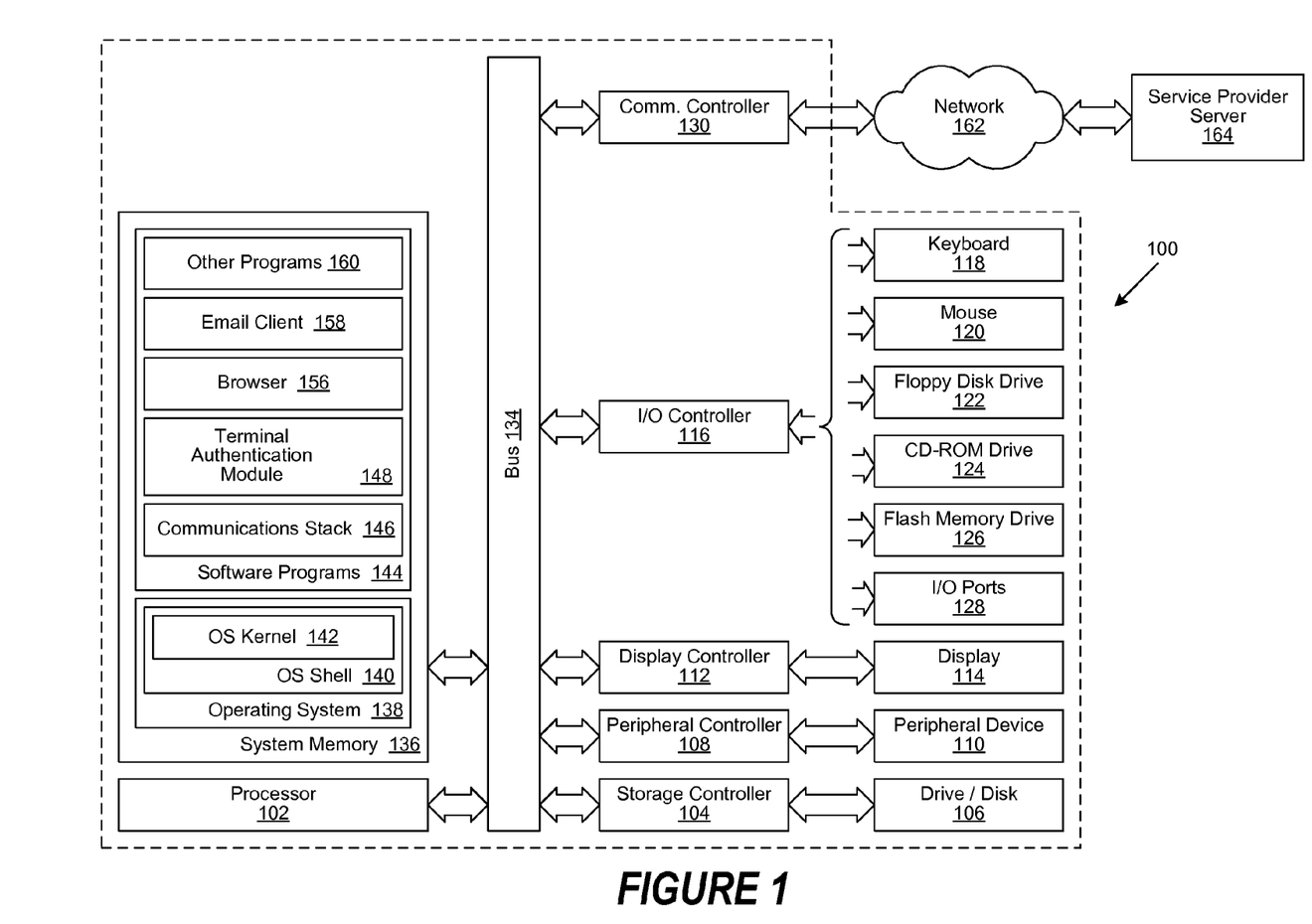
FIG. 1 depicts an exemplary client information processing system (IPS) in which embodiments of the disclosure may be implemented.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134.

Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a terminal authentication module 148. The terminal authentication module 148 includes computer executable instructions for implementing the processes described in FIGS. 2-3 described hereinbelow. In one embodiment, client IPS 100 is able to download the computer executable instructions of the terminal authentication module 148 from a service provider server 164 located at a remote location. In another embodiment, the computer executable instructions of the terminal authentication module 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
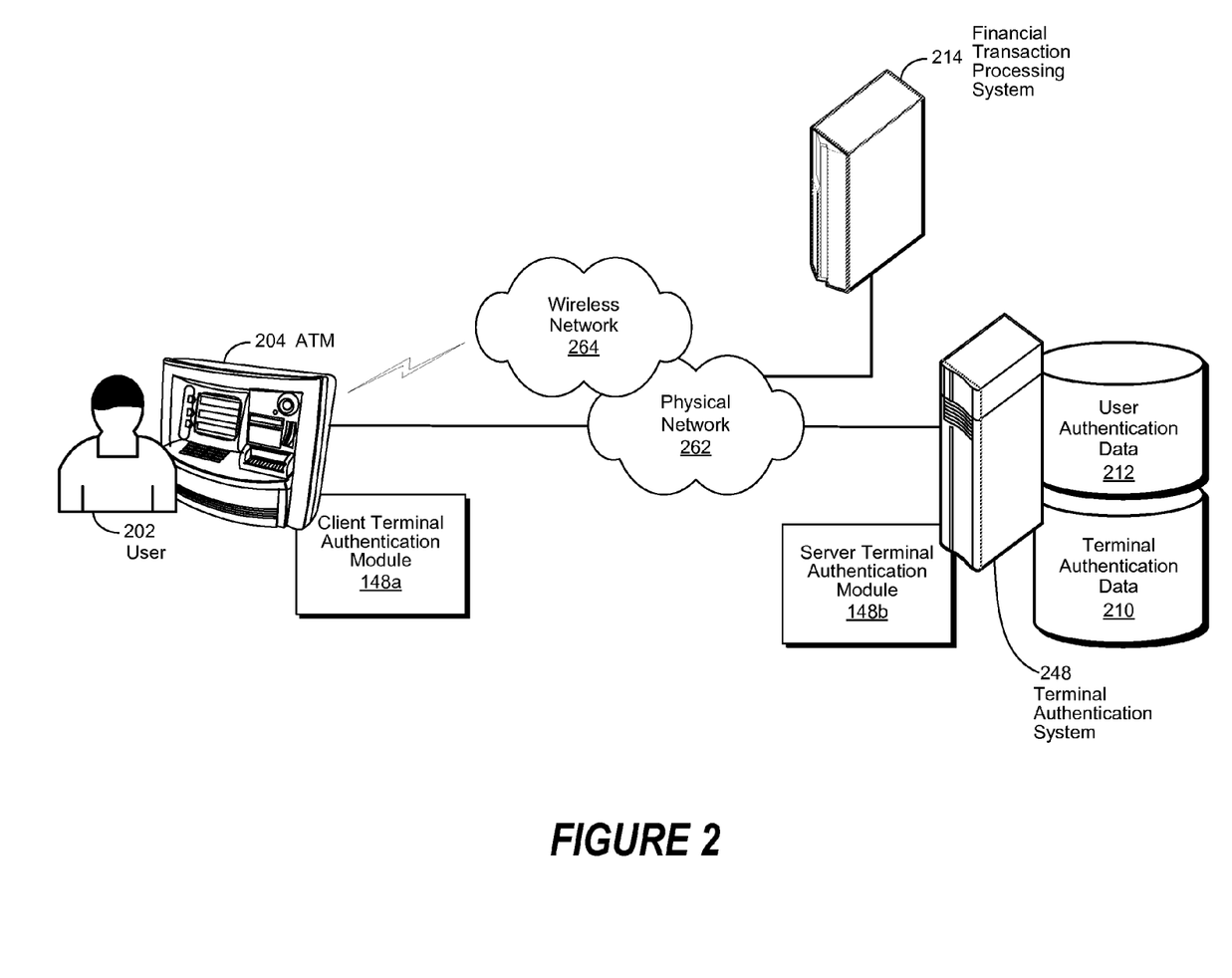
FIG. 2 is a simplified block diagram of a terminal authentication module as implemented in accordance with an embodiment of the invention.

FIG. 2 is a simplified block diagram of a terminal authentication module as implemented in accordance with an embodiment of the invention. In various embodiments, a financial transaction terminal, such as an automated teller machine (ATM) 204, is authenticated to a user 202. In these and other embodiments, an ATM 204 is connected to a terminal authentication system 248 through a physical connection to a physical network 262 or wireless connection to a wireless network 264. Likewise, a financial transaction processing system 214 is connected to the terminal authentication system 248 through a physical connection to physical network 262. The financial transaction processing system 214 is likewise connected to the ATM 204 through a physical connection to the physical network 262 or a wireless connection to the wireless network 264. In this embodiment the ATM 204 comprises a terminal authentication module 148*a*, implemented as a client and the terminal authentication system 248 comprises a terminal authentication module 148*b* implemented as a server. Likewise, the terminal authentication system 248 comprises a repository of terminal authentication data 210 and a repository of user authentication data 212.

In this embodiment, a user 202 inserts a card containing financial account data into the ATM 204, which reads the account number from the financial account data on the card and determines a unique terminal identifier. In one embodiment, the unique terminal identifier comprises a media access control (MAC) address. In another embodiment, the unique terminal identifier comprises an international mobile equipment identity (IMEI). In yet another embodiment, the unique terminal identifier comprises a network address, such as an Internet Protocol (IP) or System Network Architecture (SNA) address. The account number and the unique terminal identifier are then combined to generate terminal authentication data. In one embodiment, the terminal authentication data is generated by the terminal authentication module 148*a* implemented as a client. In various embodiments, more than one unique terminal identifier is used to generate the terminal authentication data. In these and other embodiments, additional financial account data in addition to the account number is used to generate the terminal authentication data. In various embodiments, the terminal authentication data is generated by performing encryption operations known to skilled practitioners of the art. It will be apparent to those of skill in the art that many such embodiments are possible and the foregoing are not intended to limit the spirit, scope, or intent of the disclosure.

The terminal authentication data is then provided ATM 204 to the terminal authentication system 248. The account number and the unique terminal identifier are then extracted from the terminal authentication data by the terminal authentication system 248. The unique terminal identifier is compared to a list of authenticated terminal identifiers. In one embodiment, the list of authenticated terminal identifiers is stored in the repository of terminal authentication data 210. In various embodiments, the extraction and comparison operations are performed by a terminal authentication module 148*b* implemented as a server on the terminal authentication system 248. In various embodiments, the account number and the unique terminal identifier is extracted from the terminal authentication data by performing decryption operations known to skilled practitioners of the art.

If the unique terminal identifier is authentic, then a shared secret associated with the account number is retrieved. In one embodiment, the shared secret is stored in the repository of user authentication data 212. In various embodiments, the shared secret may comprise a word, a phrase, an alphanumeric string, a graphical element, or any combination of graphical and alphanumeric elements selected by the user or provided on behalf of the user by the terminal authentication system. It will be apparent to those of skill in the art that many such embodiments are possible and the foregoing are not intended to limit the spirit, scope, or intent of the disclosure. Shared secret data is then generated from the shared secret in operation 330. In one embodiment, the shared secret data is generated by the terminal authentication module 148b implemented as a server on the terminal authentication system 248. In various embodiments, the shared secret data is generated by performing encryption operations known to skilled practitioners of the art. The shared secret data is then provided to the ATM 204 by the terminal authentication system 248 over a network connection to physical network 262 or wireless network 264.

The shared secret is extracted from the shared secret data. In one embodiment, the shared secret data is extracted by a terminal authentication module 148a implemented as a client on the ATM 204. In various embodiments, the shared secret is extracted from the shared secret data by performing decryption operations known to skilled practitioners of the art. Once extracted, the shared secret is displayed to the user 202 by the ATM 204 within a user interface. The user 202 is then prompted to respond whether the displayed shared secret is authentic. If an affirmative response is received by the ATM 204 from the user 202, then the user 202 is prompted to provide authentication information, such as a Personal Identification Number (PIN). The user 202 then provides the requested authentication information and the transaction is continued.

Figure 3:
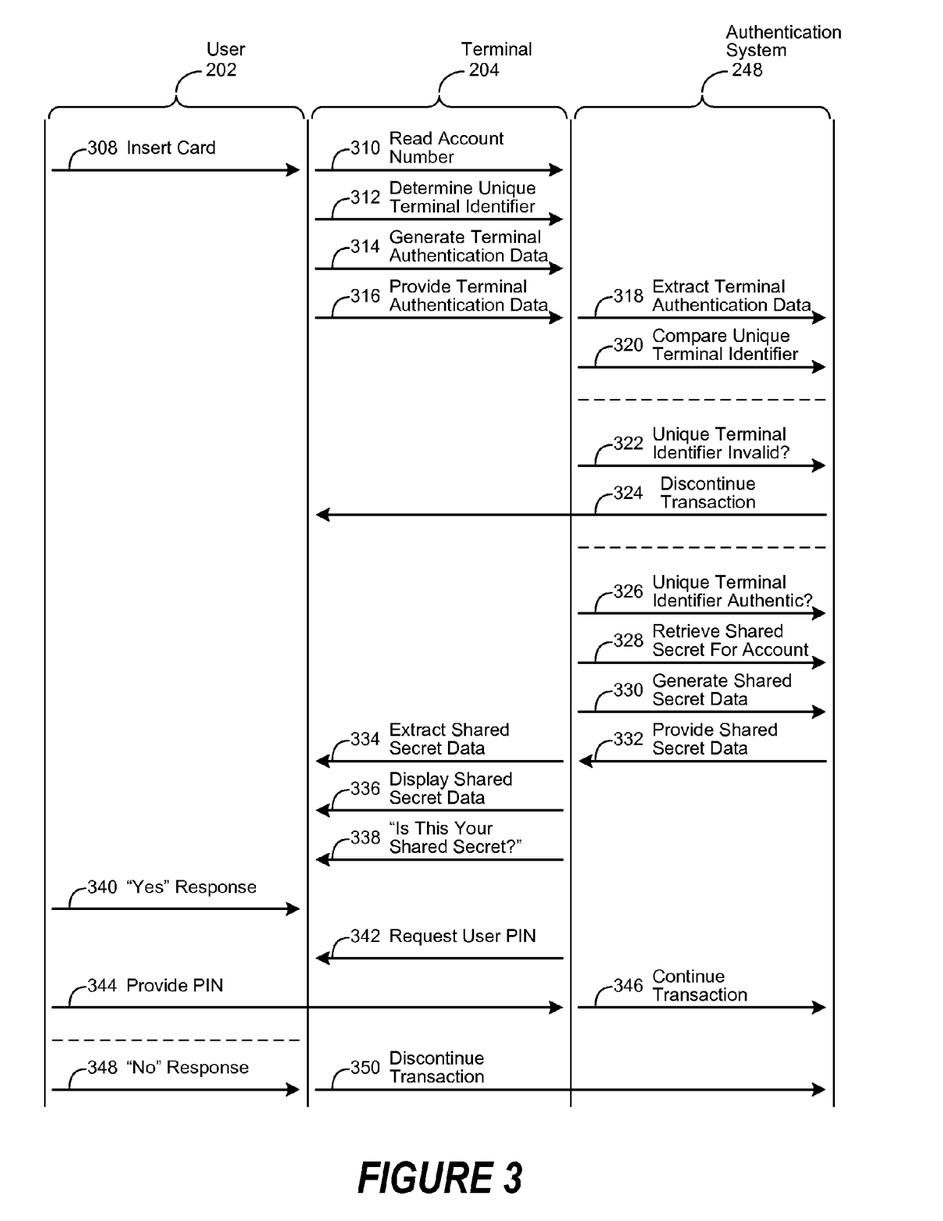
FIG. 3 is a generalized process flow diagram of the operation of a terminal authentication module as implemented in accordance with an embodiment of the invention.

FIG. 3 is a generalized process flow diagram of the operation of a terminal authentication module as implemented in accordance with an embodiment of the invention. In various embodiments, a financial transaction terminal 204, such as an automated teller machine (ATM), is authenticated to a user 202. In this embodiment, financial transaction authentication operations are begun in operation 308 with the user 202 inserting a card containing financial account data into the financial transaction terminal. In operation 310, the financial transaction terminal 204 reads the account number from the financial account data on the card. In operation 312, the financial transaction terminal 204 determines a unique terminal identifier. In one embodiment, the unique terminal identifier comprises a media access control (MAC) address. In another embodiment, the unique terminal identifier comprises an international mobile equipment identity (IMEI). In yet another embodiment, the unique terminal identifier comprises a network address, such as an Internet Protocol (IP) or System Network Architecture (SNA) address.

The account number and the unique terminal identifier are then combined to generate terminal authentication data in operation 314. In one embodiment, the terminal authentication data is generated by a terminal authentication module implemented as a client at the financial transaction terminal 204. In various embodiments, more than one unique terminal identifier is used to generate the terminal authentication data. In these and other embodiments, additional financial account data in addition to the account number is used to generate the terminal authentication data. In various embodiments, the terminal authentication data is generated by performing encryption operations known to skilled practitioners of the art. It will be apparent to those of skill in the art that many such embodiments are possible and the foregoing are not intended to limit the spirit, scope, or intent of the disclosure.

The terminal authentication data is then provided in operation 316 by the financial transaction terminal 204 to a terminal authentication system 248. Once the terminal authentication data is received, the terminal authentication system 248 extracts the account number and the unique terminal identifier in operation 318. In operation 320, the unique terminal identifier is compared to a list of authenticated terminal identifiers. In various embodiments, the comparison is performed by a terminal authentication module implemented as a server on the terminal authentication system 248. In these and other embodiments, the account number and the unique terminal identifier is extracted from the terminal authentication data by performing decryption operations known to skilled practitioners of the art.

A determination is then made in operation 322 whether the unique terminal identifier is authentic. If it is determined in operation 324 that the unique terminal identifier is invalid or not authenticable, then the transaction is discontinued in operation 326. Otherwise, a shared secret associated with the account number is retrieved in operation 328. In various embodiments, the shared secret may comprise a word, a phrase, an alphanumeric string, a graphical element, or any combination of graphical and alphanumeric elements selected by the user or provided on behalf of the user by the terminal authentication system 248. It will be apparent to those of skill in the art that many such embodiments are possible and the foregoing are not intended to limit the spirit, scope, or intent of the disclosure. Shared secret data is then generated from the shared secret in operation 330. In one embodiment, the shared secret data is generated by a terminal authentication module implemented as a server on the terminal authentication system 248. In various embodiments, the shared secret data is generated by performing encryption operations known to skilled practitioners of the art. The shared secret data is then provided in operation 332 to the financial transaction terminal 204.

In operation 334, the shared secret is extracted from the shared secret data. In one embodiment, shared secret data is extracted by a terminal authentication module implemented as a client at the financial transaction terminal 204. In various embodiments, the shared secret is extracted from the shared secret data by performing decryption operations known to skilled practitioners of the art. Once extracted, the shared secret is displayed in operation 336 to the user 202 by the financial transaction terminal 204 within a user interface. The user 202 is then prompted in operation 338 to respond whether the displayed shared secret is authentic. If an affirmative response is received by the financial transaction terminal 204 from the user 202 in operation 340, then the user 202 is prompted in operation 342 to provide authentication information, such as a Personal Identification Number (PIN). The user 202 then provides the requested authentication information in operation 344, and the transaction is continued in operation 346. However, if a negative response is received by the financial transaction terminal 204 from the user 202 in operation 348, then the transaction is discontinued in operation 350.

In these and other embodiments, the user provides financial account data, such as an account number, account balances, transactional history and the like, to the financial transaction terminal. The financial account data is then combined with a unique identifier of the financial transaction terminal to generate terminal authentication data, which is provided to a terminal authentication system. The financial account data and the unique identifier of the financial transaction terminal are then extracted. Once extracted, the unique identifier of the financial transaction terminal is compared to a list of authentic financial transaction terminals. If its authenticity is confirmed, then a shared secret corresponding to the financial account data is provided to the authenticated financial transaction terminal. The user is queried as to the authenticity of the shared secret. If the response is affirmative, then the user 202 is prompted to provide user authentication information, such as a Personal Identification Number (PIN), and the transaction proceeds. Otherwise, the transaction is terminated.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein.

Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A non-transitory computer readable medium comprising computer readable instructions when executed by a processor cause the processor to perform a method of:
   receiving input data from a user using an ATM, wherein said input data comprises a financial account identifier corresponding to said user;
   combining said financial account identifier and an identifier corresponding to the ATM being used by the user to generate terminal authentication data; and
   providing said terminal authentication data to a server terminal authentication module;
   comparing said identifier with one or more known authentic ATM identifiers; and
   transmitting to the ATM being used by the user at least one secret data element associated with the user of the ATM if the identifier corresponding to the ATM being used by the user is one of the known authentic ATM identifiers, and not transmitting to the ATM being used by the user any secret data elements if the identifier corresponding to the ATM being used by the user is not one of the known authentic ATM identifiers.

2. The non-transitory computer readable medium of claim 1, wherein said identifier comprises a media access control (MAC) address.

3. The non-transitory computer readable medium of claim 1, wherein said identifier comprises a network address.

4. The non-transitory computer readable medium of claim 1, wherein said terminal authentication data is generated from said financial account identifier and said identifier by performing an encryption operation.

5. The non-transitory computer readable computer-usable medium of claim 1, wherein said financial account identifier and said identifier are extracted from said terminal authentication data by performing a decryption operation.

6. The non-transitory computer readable medium of claim 1, wherein the computer executable instructions are provided to a client computer from a server, wherein said server is located at a remote location.

7. The non-transitory computer readable medium of claim 1, wherein the computer executable instructions are provided as a service on an on-demand basis, wherein said service is provided by a service provider.

8. A non-transitory computer readable medium comprising computer readable instructions when executed by a processor to perform a method of:

receiving terminal authentication data; and extracting an identifier corresponding to an ATM being used by a user and a financial account identifier corresponding to the user using the ATM from said terminal authentication data, to compare said identifier to one or more known authentic ATM identifiers and, upon confirming the authenticity of said identifier, to provide to said user at least one shared secret data element associated with the user using the ATM if the identifier corresponding to the ATM being used by the user is one of the known authentic ATM identifiers, and not providing to the user any secret data elements if the identifier corresponding to the ATM being used by the user is not one of the known authentic ATM identifiers.

9. The non-transitory computer readable medium of claim 8, wherein said identifier comprises a media access control (MAC) address.

10. The non-transitory computer readable medium of claim 8, wherein said identifier comprises a network address.

11. The non-transitory computer readable medium of claim 8, wherein said terminal authentication data is generated from said financial account identifier and said identifier by performing an encryption operation.

12. The non-transitory computer readable medium of claim 8, wherein said financial account identifier and said identifier are extracted from said terminal authentication data by performing a decryption operation.

13. The non-transitory computer readable medium of claim 8, wherein the computer executable instructions are provided to a client computer from a server, wherein said server is located at a remote location.

14. The non-transitory computer readable medium of claim 8, wherein the computer executable instructions are provided as a service on an on-demand basis, wherein said service is provided by a service provider.

* * * * *